US012124195B2

(12) United States Patent
Doi et al.

(10) Patent No.: US 12,124,195 B2
(45) Date of Patent: Oct. 22, 2024

(54) IMAGE FORMING APPARATUS HAVING A FIXING UNIT AND HEATING CONTROL METHOD

(71) Applicant: Toshiba Tec Kabushiki Kaisha, Tokyo (JP)

(72) Inventors: Yohei Doi, Mishima Shizuoka (JP); Eiji Shinohara, Mishima Shizuoka (JP); Kazuhiko Kikuchi, Yokohama Kanagawa (JP); Sasuke Endo, Chigasaki Kanagawa (JP); Masaya Tanaka, Sunto Shizuoka (JP); Ryota Saeki, Sunto Shizuoka (JP); Kousei Miyashita, Sunto Shizuoka (JP); Ryosuke Kojima, Sunto Shizuoka (JP); Yuki Kawashima, Tagata Shizuoka (JP); Kiyotaka Murakami, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/453,261

(22) Filed: Aug. 21, 2023

(65) Prior Publication Data

US 2023/0393501 A1 Dec. 7, 2023

Related U.S. Application Data

(63) Continuation of application No. 17/591,560, filed on Feb. 2, 2022, now Pat. No. 11,774,887, which is a (Continued)

(30) Foreign Application Priority Data

Sep. 11, 2019 (JP) ................................ 2019-165351

(51) Int. Cl.
*G03G 15/20* (2006.01)

(52) U.S. Cl.
CPC ..... *G03G 15/2039* (2013.01); *G03G 15/2053* (2013.01); *G03G 2215/2025* (2013.01)

(58) Field of Classification Search
CPC ................................................. G03G 15/2039

(Continued)

(56) References Cited

U.S. PATENT DOCUMENTS 8,971,735 B2 3/2015 Yoshimura
10,429,789 B2 10/2019 Karino (Continued)

FOREIGN PATENT DOCUMENTS

JP S62-075571 A 4/1987
JP H09-096977 A 4/1997

(Continued)

OTHER PUBLICATIONS

Kikuchi. Machine translation of JP2015031892A. Publsiedh Feb. 2015. Accessed Mar. 2024. (Year: 2015).*

(Continued)

*Primary Examiner* — Walter L Lindsay, Jr.
*Assistant Examiner* — Philip T Fadul
(74) *Attorney, Agent, or Firm* — Kim & Stewart LLP

(57) ABSTRACT

An image processing apparatus includes a fixing unit including a belt, and a heater configured to heat the belt and including a substrate and a heating layer that is formed on the substrate, and a controller configured to shut off the heater if no current flows through the belt.

17 Claims, 8 Drawing Sheets

Related U.S. Application Data continuation of application No. 17/209,103, filed on Mar. 22, 2021, now Pat. No. 11,275,330, which is a continuation of application No. 16/885,209, filed on May 27, 2020, now Pat. No. 10,990,044.

(58) Field of Classification Search
USPC ............................................................ 399/67
See application file for complete search history.

(56) References Cited

U.S. PATENT DOCUMENTS

| | | | | |
|---|---|---|---|---|
| 10,990,044 | B2 | 4/2021 | Doi et al. | |
| 11,275,330 | B2 | 3/2022 | Doi et al. | |
| 2015/0277306 | A1 | 10/2015 | Kondo | |
| 2015/0323893 | A1 | 11/2015 | Okajima | |
| 2019/0163114 | A1* | 5/2019 | Ishikawa | H02M 5/22 |

FOREIGN PATENT DOCUMENTS

| | | | |
|---|---|---|---|
| JP | 2012-133154 | A | 7/2012 |
| JP | 2015-031892 | A | 2/2015 |
| JP | 2016-057399 | A | 4/2016 |

OTHER PUBLICATIONS

Notice of Reasons for Refusal mailed May 23, 2023 in corresponding Japanese Patent Application No. 2019-165351, 8 pages (with Translation).
Extended European Search Report mailed Dec. 11, 2020 in corresponding European Patent Application No. 20186284.4, 8 pages.

* cited by examiner

IMAGE FORMING APPARATUS HAVING A FIXING UNIT AND HEATING CONTROL METHOD

CROSS-REFERENCE TO RELATED APPLICATION

This application is a continuation of U.S. patent application Ser. No. 17/591,560, filed Feb. 2, 2022, which is a continuation of U.S. patent application Ser. No. 17/209,103, filed Mar. 22, 2021, now U.S. Pat. No. 11,275,330, issued on Mar. 15, 2022, which is a continuation of U.S. patent application Ser. No. 16/885,209, filed on May 27, 2020, now U.S. Pat. No. 10,990,044, issued on Apr. 27, 2021, which is based upon and claims the benefit of priority from Japanese Patent Application No. 2019-165351, filed Sep. 11, 2019, the entire contents of which are incorporated herein by reference.

FIELD

Embodiments described herein relate generally to an image forming apparatus and a heating control method.

BACKGROUND

In a belt type or on-demand type fixing device, static electricity may be accumulated on a fixing belt because of its repeated sliding contact with sheets of paper and a heater element of the fixing device. When static electricity accumulates on the fixing belt, an electrostatic offset may occur, thereby deteriorating the quality of an output image formed on the sheet. To prevent the occurrence of such an electrostatic offset, a method has been developed to discharge the accumulated static electricity by connecting the fixing belt to a ground potential (hereinafter, referred to as "GND"). However, since the fixing belt rotates, the connection between the fixing belt and GND tends to be unstable or difficult to maintain continuously.

DETAILED DESCRIPTION

In general, according to one embodiment, an image forming apparatus capable of preventing quality deterioration of an image, and a heating control method are provided.

According to one embodiment, an image processing apparatus includes a fixing unit including a belt, and a heater configured to heat the belt and including a substrate and a heating layer that is formed on the substrate, and a controller configured to shut off the heater if no current flows through the belt.

Hereinafter, an image forming apparatus and a heating control method according to example embodiments will be described with reference to the drawings.

Figure 1:
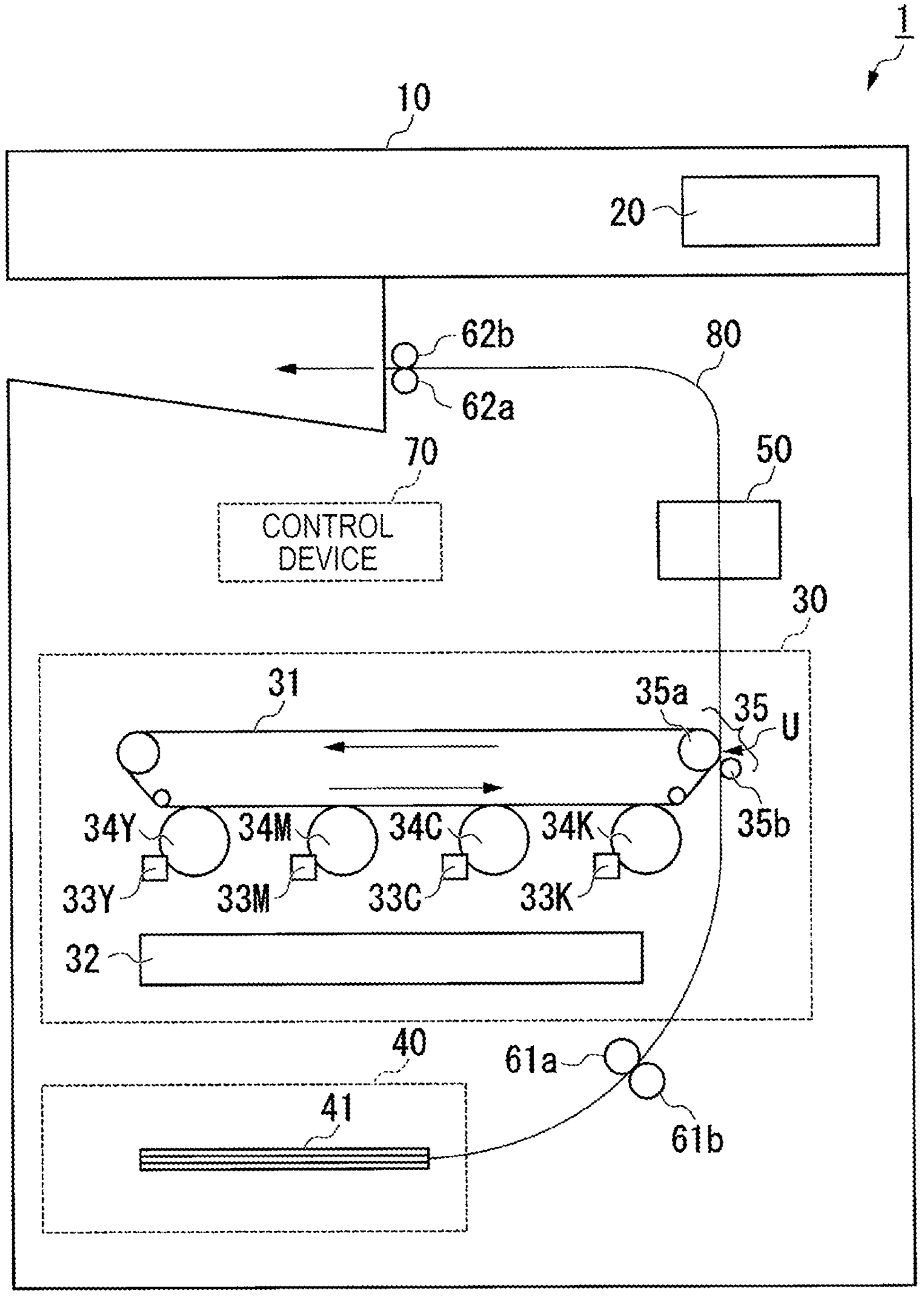
FIG. 1 shows a configuration of an image forming apparatus according to an embodiment.

FIG. 1 shows a configuration of an image forming apparatus 1 according to an embodiment. The image forming apparatus 1 is a multi function peripheral (MFP) device. The image forming apparatus 1 performs an image forming process and an image fixing process. The image forming process is a process of forming an image on a sheet. The image fixing process is a process of fixing the formed image onto the sheet. The sheet is, for example, a piece of paper on which characters, text, images, or the like can be formed. In general, any type of sheet can be used as long as the sheet can be handled by the image forming apparatus 1. The image forming apparatus 1 can scan or read images on a sheet or document, generate digital data thereby, and generate an image file corresponding to an image on the sheet or document.

The image forming apparatus 1 includes an image reading unit 10, a control panel 20, an image forming unit 30, a sheet storage unit 40, a fixing device 50, conveyor rollers 61*a* and 61*b*, paper discharge rollers 62*a* and 62*b*, and a control device 70.

The image reading unit 10 reads an image formed on a sheet as bright and dark signals. For example, the image reading unit 10 reads (scans) an image printed on a sheet set on a document reading table or platen of the image forming apparatus 1. The image reading unit 10 records the image data that is read/scanned. The recorded image data may be transmitted to another information processing apparatus via a network. The recorded image data may be used to form a corresponding image on another sheet with the image forming unit 30.

The control panel 20 includes a display unit and an operation unit. The display unit is a display device, such as a liquid crystal display, an organic electro luminescence (EL) display, or the like. The display unit displays various types of information related to the image forming apparatus 1 according to a control signal of the control device 70. The operation unit includes a plurality of buttons, keys, switches, or the like. The operation unit receives an input operation from a user. The operation unit outputs a signal according to an input operation performed by the user to the control device 70. The display unit and the operation unit may be integrated into a touch-enabled display or the like.

The image forming unit 30 performs an image forming process. In the image forming process, the image forming unit 30 forms an image on a sheet based on image data generated by the image reading unit 10 or image data received through a network.

The image forming unit 30 includes a transfer belt 31, an exposure unit 32, a plurality of developing devices including developing devices 33Y, 33M, 33C, and 33K, and a plurality of photoconductive drums including photoconductive drums 34Y, 34M, 34C, and 34K, and a transfer unit 35.

The transfer belt 31 is an intermediate transfer body. The transfer belt 31 rotates in a direction indicated by an arrow (depicted as the counterclockwise direction) according to rotation of a roller.

The exposure unit 32 is provided below the developing devices 33Y, 33M, 33C, and 33K facing the photoconductive drums 34Y, 34M, 34C, and 34K, respectively. The exposure unit 32 emits a laser beam toward a photoconductor layer on each of the photoconductive drums 34Y, 34M, 34C, and 34K. The exposure unit 32 is controlled to emit light based on the image data by the control device 70. The exposure unit 32 emits the laser beam based on the image data, thereby a static electrical charge on the photoconductive layer of each of the photoconductive drums 34Y, 34M, 34C, and 34K disappears in areas corresponding to the exposure pattern. As a result, an electrostatic pattern is formed on the photoconductive layers of the photoconductive drums 34Y, 34M, 34C, and 34K. In other words, by the emission of the laser beam by the exposure unit 32, an electrostatic latent image is formed on the photoconductive layers of the photoconductive drums 34Y, 34M, 34C, and 34K. In some examples, the exposure unit 32 may use light emitting diode (LED) light instead of a laser beam.

The developing devices 33Y, 33M, 33C, and 33K supply toner to the photoconductive drums 34Y, 34M, 34C, and 34K. For example, the developing device 33Y develops the electrostatic latent image on the photoconductive layer of the photoconductive drum 34Y with yellow (Y) toner. The developing device 33M develops the electrostatic latent image on the photoconductive layer of the photoconductive drum 34M with magenta (M) toner. The developing device 33C develops the electrostatic latent image on the photoconductive layer of the photoconductive drum 34C with cyan (C) toner. The developing device 33K develops the electrostatic latent image on the photoconductive layer of the photoconductive drum 33K with black (K) toner.

The developing devices 33Y, 33M, 33C, and 33K form toner images on the photoconductive drums 34Y, 34M, 34C, and 34K as visible images. The toner images formed on the photoconductive drums 34Y, 34M, 34C, and 34K are transferred onto the transfer belt 31 (primary transfer).

The transfer unit 35 includes a support roller 35*a* and a secondary transfer roller 35*b*. The transfer unit 35 transfers the toner image formed on the transfer belt 31 to the sheet at a secondary transfer location U. The secondary transfer location U is a location at which the support roller 35*a* and the secondary transfer roller 35*b* face each other with the transfer belt 31 interposed therebetween. The transfer unit 35 provides a transfer bias (controlled by a transfer current) to the transfer belt 31. The transfer unit 35 transfers the toner image on the transfer belt 31 to the sheet using the transfer bias. The control device 70 controls the transfer current used during this secondary transfer process.

The sheet storage unit 40 includes a single paper feed cassette or a plurality of paper feed cassettes. A paper feed cassette stores a sheet 41 of a predetermined size and a predetermined type. The paper feed cassette includes a pickup roller. The pickup roller picks up each sheet 41 from the paper feed cassette one by one. The pickup roller supplies the picked up sheet 41 to a conveyor unit 80.

The fixing device 50 performs the image fixing process. In particular, the fixing device 50 fixes the toner image on the sheet 41 by applying heat and pressure to the sheet 41.

The conveyor rollers 61*a* and 61*b* convey the sheet 41 fed from the paper feed cassette to the image forming unit 30. The conveyor rollers 61*a* and 61*b* face toward each other and form a nip.

The paper discharge rollers 62*a* and 62*b* discharge the sheet 41 on which the image has been formed by the fixing device 50 to a discharging unit. The paper discharge rollers 62*a* and 62*b* face toward each other and form a nip.

The control device 70 controls each unit of the image forming apparatus 1.

The conveyor unit 80 conveys the sheets 41. The conveyor unit 80 provides a sheet conveyance path that includes a plurality of rollers disposed at various points along the sheet conveyance path. The sheet conveyance path is a path along which the sheet 41 is conveyed during the image forming processing or the like. The rollers rotate to convey the sheet 41 in response to the control of the control device 70.

Hereinafter, a hardware configuration of the image forming apparatus 1 will be described.

Figure 2:
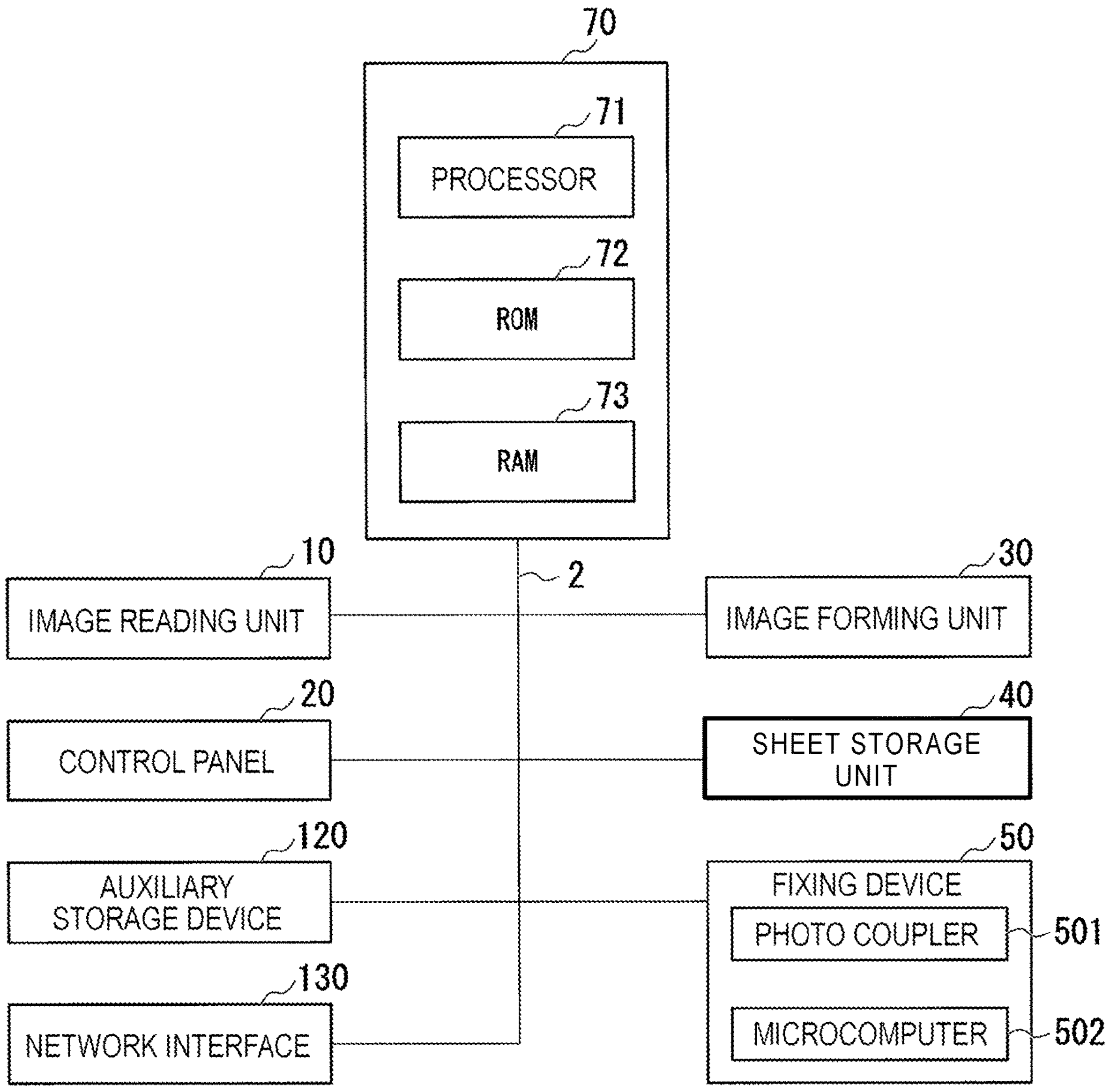
FIG. 2 is a hardware block diagram of an image forming apparatus.

FIG. 2 is a hardware block diagram of the image forming apparatus 1. The image forming apparatus 1 includes the image reading unit 10, the control panel 20, the image forming unit 30, the sheet storage unit 40, the control device 70, an auxiliary storage device 120, and a network interface 130. The various units are connected to each other via a system bus 2 to enable data communication between the units and/or the control device 70 as necessary.

The image reading unit 10, the control panel 20, the image forming unit 30, and the sheet storage unit 40 operate as described above, and thus repeated descriptions thereof are omitted.

The fixing device 50 includes a photocoupler 501 and a microcomputer 502. In some examples, the microcomputer 502 may be included in or otherwise considered a part of the control device 70. Alternatively, the function of the microcomputer 502 may be performed by a dedicated processor 71 or the like.

In this example, the control device 70 includes the processor 71, a read only memory (ROM) 72, and a random access memory (RAM) 73. The processor 71 is, for example, a central processing unit (CPU). The processor 71 performs various processes by loading a program from the ROM 72 onto the RAM 73 and then executing the program.

The ROM 72 stores a program to be executed by the processor 71. The RAM 73 temporarily stores data used by each unit of the image forming apparatus 1. The RAM 73 may also store digital data generated by the image reading unit 10. The RAM 73 may temporarily store a print job and a print job log or the like.

The auxiliary storage device 120 is, for example, a hard disk or a solid state drive (SSD), and stores various types of data. The various types of data are, for example, digital data, such as image data, a print job, a print job log, and the like.

The network interface 130 transmits and receives data to or from another apparatus. Here, in this example, the other apparatus is an information processing apparatus, such as a personal computer, a tablet terminal, a smart phone, or the like. The network interface 130 operates as an input interface to receive data or instruction transmitted from the other apparatus. The instruction transmitted from the other apparatus can be a print execution instruction. The network interface 130 operates as an output interface to transmit data to the other apparatus as needed.

Hereinafter, a configuration of the fixing device 50 will be described.

Figure 3:
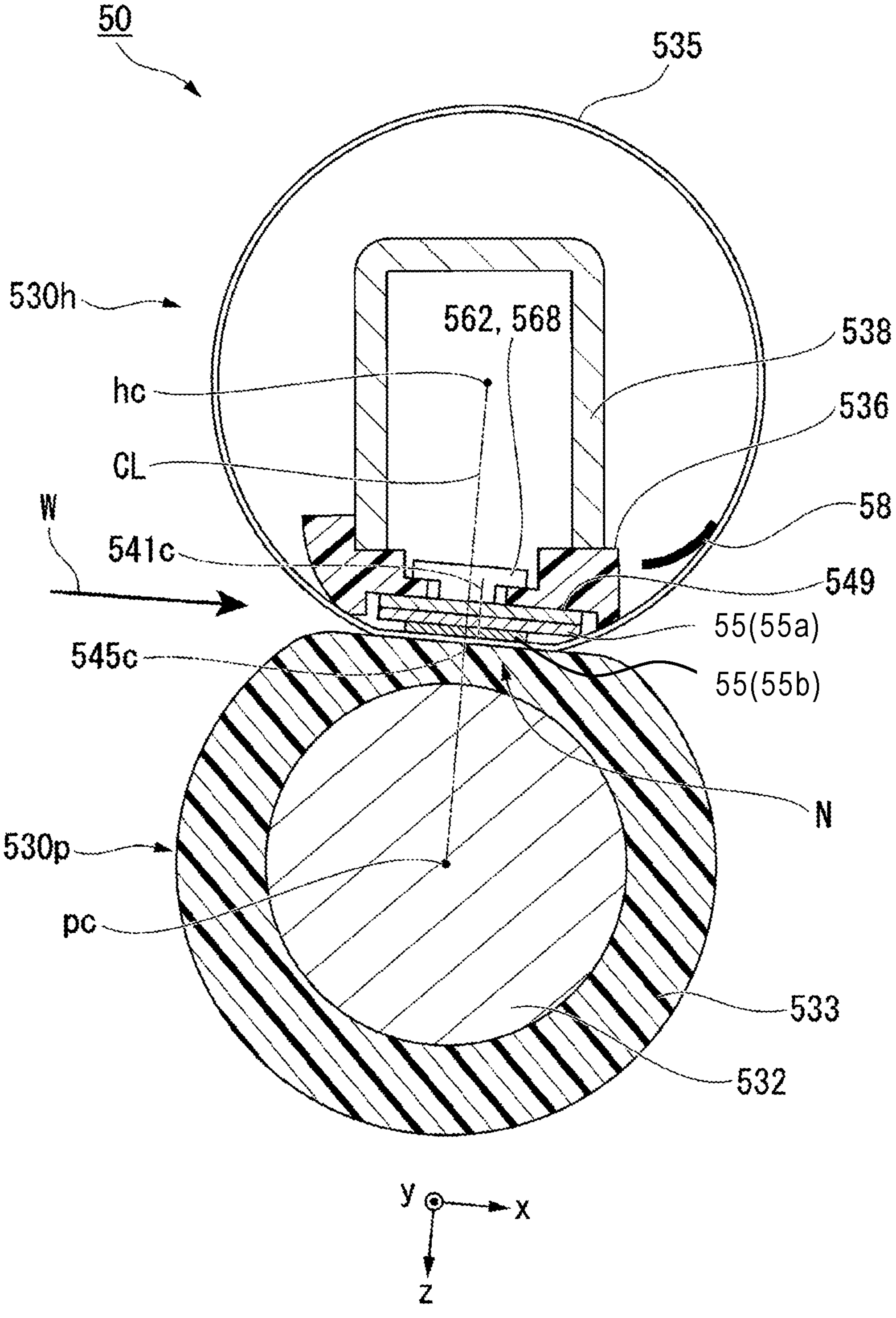
FIG. 3 is a diagram of a fixing device according to an embodiment.

FIG. 3 is a front cross-sectional view of the fixing device 50. The fixing device 50 includes a pressurizing roller 530*p* and a film unit 530*h*.

The pressurizing roller 530*p* forms a nip N with the film unit 530*h*. The pressurizing roller 530*p* presses the toner image on the sheet when the sheet enters the nip N. The pressurizing roller 530*p* rotates and conveys the sheet. The pressurizing roller 530*p* includes a cored bar 532, an elastic layer 533, and a release layer (not separately depicted).

As described above, the pressurizing roller 530*p* is capable of pressing a surface of a cylindrical film 535 and is rotatable.

The cored bar 532 is formed in a cylindrical shape by a metal material such as stainless steel or the like. Both end portions of the cored bar 532 in an axial direction are rotatably supported. The cored bar 532 is driven by a motor to rotate. The cored bar 532 contacts, for example, a cam member. The cam member rotates such that the cored bar 532 will approach and be separated from the film unit 530*h* according to the cam member position.

The elastic layer 533 is formed of an elastic material such as silicone rubber or the like. The elastic layer 533 is formed on an outer peripheral surface of the cored bar 532 in a uniform thickness.

The release layer is formed of a resin material such as a poly[tetrafluoroethylene-co-perfluoro (alkyl vinyl ether)] copolymer or the like (referred to as a PFA resin in this context). The release layer is formed on an outer peripheral surface of the elastic layer 533.

Hardness of an outer peripheral surface of the pressurizing roller 530*p* may be 40° to 70° with respect to a load of 9.8 N measured by an ASKER-C hardness tester. Accordingly, the area of the nip N and the durability of the pressurizing roller 530*p* are secured.

The pressurizing roller 530*p* can approach and be separated from the film unit 530*h* via rotation of the cam member. The nip N is formed when the pressurizing roller 530*p* is brought close to the film unit 530*h* and pressed by a spring element or the like. However, if a sheet jam occurs at the fixing device 50, the jammed sheet may be removed by separating the pressurizing roller 530*p* from the film unit 530*h* by rotation of the cam member. Plastic deformation of the cylindrical film 535 is prevented by separating the pressurizing roller 530*p* from the film unit 530*h* when the cylindrical film 535 is not rotating, e.g., during a sleep state.

The pressurizing roller 530*p* is rotated by a motor. When the pressurizing roller 530*p* is rotated while the nip N is formed, the cylindrical film 535 of the film unit 530*h* is driven and rotated. The pressurizing roller 530*p* rotates and conveys a sheet in a conveying direction W through the nip N.

The film unit 530*h* heats a toner image on the sheet that has entered the nip N. The film unit 530*h* includes the cylindrical film 535, a heater 55, a heat transfer member 549, a support member 536, a stay 538, a heater thermometer 562, a thermostat 568, and a thermistor 58.

The cylindrical film 535 is formed in a cylindrical shape. The cylindrical film 535 includes a base layer, an elastic layer, and a release layer arranged sequentially from an inner peripheral side. The base layer is formed in a cylindrical shape of a material such as nickel (Ni). The elastic layer is stacked on an outer peripheral surface of the base layer. The elastic layer is formed of an elastic material such as silicone rubber or the like. The release layer is stacked on an outer peripheral surface of the elastic layer. The release layer is formed of a material such as PFA resin or the like.

The heater 55 includes a substrate 55*a* and a heating layer 55*b*. In the present disclosure, an x direction, a y direction, and a z direction are defined as follows. The y direction is a longitudinal direction of the substrate 55*a*. The y direction is parallel to a width direction and the rotation axis of the cylindrical film 535. The x direction is a lateral direction of the substrate 55*a* and thus is perpendicular to the y direction. The z direction is a normal direction of the substrate 55*a* and perpendicular to the x and y directions. A configuration of the heater 55 will be described later.

As shown in FIG. 3, a straight line CL connecting an axis pc of the pressurizing roller 530*p* and an axis hc of the film unit 530*h* is defined. A center 541*c* of the substrate 55*a* in the x direction is arranged in a +x direction with respect to the straight line CL. Since the substrate 55*a* extends in the +x direction of the nip N with respect to the substrate 55*a*, the temperature of the edge in the +x direction of the substrate 55*a* tends to be lower, which helps a sheet passing through the nip N in separating from the film unit 530*h*.

A center 545*c* of the heating layer 55*b* in the x direction is located on the straight line CL. The heating layer 55*b* is entirely included in an area of the nip N and is present at the center of the nip N. Accordingly, heat distribution in the nip N is substantially uniform, and thus the sheet passing through the nip N is uniformly heated.

As shown in FIG. 3, the heater 55 is arranged inside the cylindrical film 535. A lubricant is applied on an inner peripheral surface of the cylindrical film 535. The heater 55 contacts the inner peripheral surface of the cylindrical film 535 via the lubricant. When the heater 55 generates heat, the viscosity of the lubricant will be decreased. Accordingly, the sliding property between the heater 55 and the cylindrical film 535 is improved by the heating.

As described above, the cylindrical film 535 is a thin film, which slides along a surface of the heater 55 while contacting the surface.

The heat transfer member 549 is formed of a metal material having high thermal conductivity, such as copper or the like. An outer shape of the heat transfer member 549 is similar to an outer shape of the substrate 55*a* of the heater 55. The heat transfer member 549 contacts a surface of the heater 55.

The support member 536 is formed of a resin material, such as liquid crystal polymer or the like. The support member 536 is arranged to cover the upper (z direction) surface side in FIG. 3 of the heater 55 and both sides in the x direction. The support member 536 supports the heater 55 through the heat transfer member 549. Round chamfers are formed on both end portions of the support member 536 in the x direction. The support member 536 supports the inner peripheral surface of the cylindrical film 535 at both end portions of the heater 55 in the x direction.

When the sheet passing through the fixing device 50 is heated, a temperature distribution occurs in the heater 55 according to a size of the sheet. When the temperature of the heater 55 is locally increased, the temperature may exceed a heat-tolerance temperature of the support member 536 formed of the resin material. The heat transfer member 549 averages (mediates) the temperature distribution along the heater 55. Accordingly, the heat resistance of the support member 536 can be secured even if certain local temperatures at points along the length of the heater 55 are higher than the heat-tolerance temperature of the support member 536.

The stay 538 shown in FIG. 3 is formed of a bent steel plate material or the like. A cross section of the stay 538 perpendicular to the y direction is formed in a U shape. The stay 538 is mounted on the above (z direction) support member 536. The support member 536 is positioned at the ends of the U-shaped opening so as to close the U-shaped opening of the stay 538. The stay 538 extends in the y direction. Both end portions of the stay 538 in the y direction are fixed to a housing or the like of the image forming apparatus 1. Accordingly, the film unit 530*h* is physically supported by the image forming apparatus 1. The stay 538 improves rigidity of the film unit 530*h* to limit bending or flexing. A flange (not shown) for restricting movement of the cylindrical film 535 in the y direction is mounted near both end portions of the stay 538 in the y direction.

The heater thermometer 562 is arranged on the upper (z direction) surface side of the heater 55 with the heat transfer member 549 disposed therebetween. For example, the heater thermometer 562 is a thermistor. The heater thermometer 562 is mounted on and supported by a surface of the support member 536. A temperature sensitive element of the heater thermometer 562 contacts the heat transfer member 549 through a hole penetrating the support member 536 in the z direction. The heater thermometer 562 measures the temperature of the heater 55 via the heat transfer member 549.

The thermostat 568 is arranged on the heater 55 similarly to the heater thermometer 562. The thermostat 568 blocks a current flowing to the heating layer when the temperature of the heater 55 detected via the heat transfer member 549 exceeds a predetermined temperature.

The thermistor 58 (also referred to as a film thermometer) is arranged inside the cylindrical film 535 as shown in FIG. 3. The thermistor 58 contacts the inner peripheral surface of the cylindrical film 535 and measures the temperature of the cylindrical film 535.

In addition to the heater thermometer 562 and the thermistor 58, the image forming apparatus 1 may further include an environmental thermometer for measuring surrounding temperatures or the like. In general, the environmental thermometer measures a temperature around the mounted location thereof. The environmental thermometer may be mounted on any location in the vicinity of the fixing device 50. In this context, the vicinity of the fixing device 50 is any location where the environmental thermometer is able to measure an environment temperature of the space in which the fixing device 50 is located. The environmental thermometer may be mounted on, for example, a housing located outside the film unit 530*h*.

Figure 4:
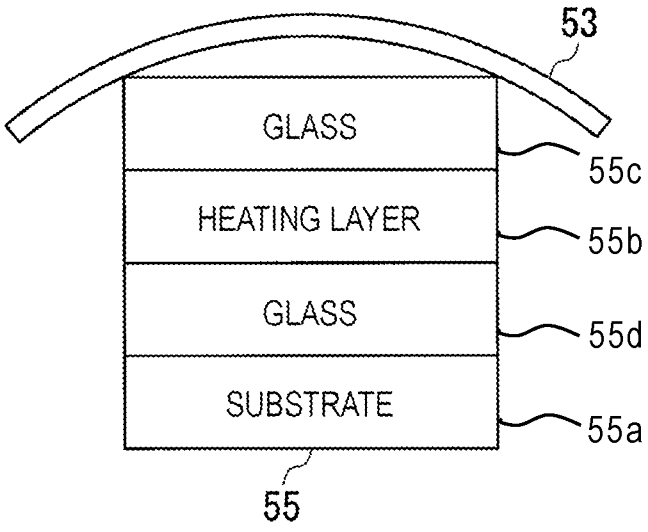
FIG. 4 is a diagram showing a structure of a heater.

FIG. 4 is a diagram showing a configuration of the heater 55.

As shown in FIG. 4, the heater 55 includes four layers including a glass layer 55*c*, the heating layer 55*b*, a glass layer 55*d*, and the substrate 55*a* stacked in this order on an inner surface of a fixing belt 53.

The substrate 55*a* is formed of a metal material such as stainless steel or the like, or a ceramic material such as aluminum nitride or the like. The substrate 55*a* is formed in an elongated rectangular plate shape. The substrate 55*a* is arranged inside the cylindrical film 535. The substrate 55*a* extends in a longitudinal direction parallel to an axial direction of the cylindrical film 535.

The heating layer 55*b* is formed of, for example, a silver palladium alloy or the like. An outer shape of the heating layer 55*b* has a rectangular shape, the longitudinal direction of which corresponds to the y direction and the lateral direction of which corresponds to the x direction.

Hereinafter, a mechanism for detecting whether the fixing belt 53 included in the fixing device 50 of the image forming apparatus 1 is connected to GND.

Figure 5:
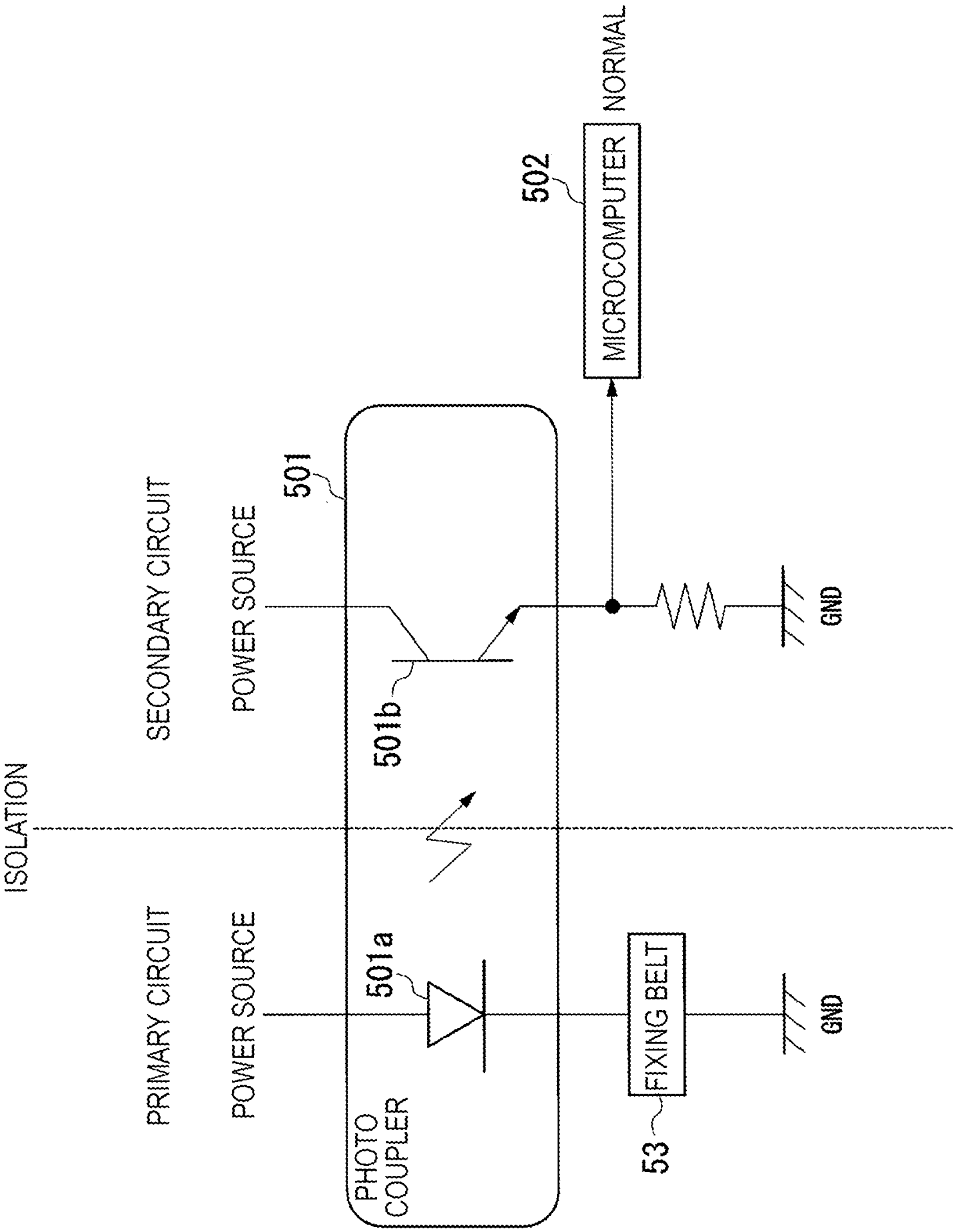
FIGS. 5 and 6 are schematic diagrams showing a mechanism for detecting whether a fixing belt according to an embodiment is connected to GND.

FIG. 5 is a schematic diagram showing the mechanism for detecting whether the fixing belt 53 of the current embodiment is connected to GND.

As shown in FIG. 5, the photocoupler 501 and the microcomputer 502 are used as the mechanism for detecting whether the fixing belt 53 is connected to GND. Alternatively, instead of the photocoupler 501, for example, another insulating type detection element, such as a current transformer, may be used as the insulated detection element. In other words, any element may be used instead of the photocoupler 501 as long as a current flowing on a primary circuit side is detectable on a secondary circuit side in a non-contact (insulated) manner.

As shown in FIG. 5, the photocoupler 501 includes a light emitting diode 501*a* and a light receiving element 501*b*. An anode of the light emitting diode 501*a* is connected to a power source of a primary circuit. A cathode of the light emitting diode 501*a* is connected to the fixing belt 53. The fixing belt 53 is connected to GND. An anode of the light receiving element 501*b* is connected to a power source of a secondary circuit. A cathode of the light receiving element 501*b* is connected to the microcomputer 502 and GND.

According to such a configuration, when the fixing belt 53 is connected to GND, the light emitting diode 501*a* emits light because a current flows from the power source on the primary circuit through the light emitting diode 501*a* to GND. When light emitted by the light emitting diode 501*a* is being received by the light receiving element 501*b*, the light receiving element 501*b* passes a current from the power source of the secondary circuit to GND. When detecting a current passing through the light receiving element 501*b*, the microcomputer 502 outputs, to the control device 70, a notification indicating normality (a normal state). If current does not pass through the light receiving element 501*b* (that is, no light is detected from the light emitting diode 501*a*) a notification indicating abnormality (an abnormal state) is output from the microcomputer 502 to the control device 70.

The control device 70 obtains the notification output from the microcomputer 502. When the notification indicating the normal state is obtained, the control device 70 determines that the fixing belt 53 is connected to GND. When it is determined that the fixing belt 53 is connected to GND (normal state), the control device 70 starts rotation (or maintains rotation) of the fixing belt 53 and starts a heating process (or maintains a heating process) by the heater 55.

Figure 6:
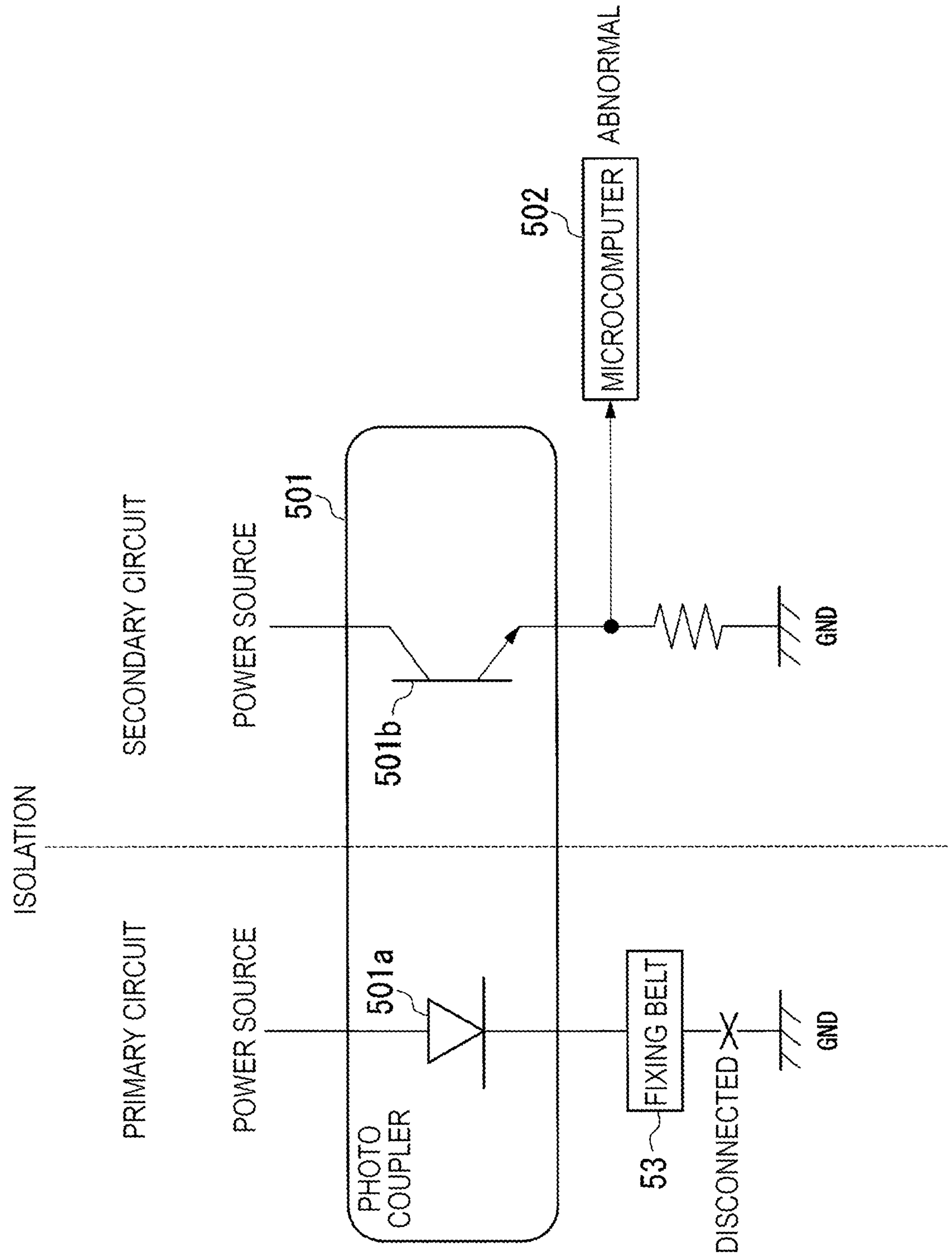

FIG. 6 shows a case in which the fixing belt 53 is not connected to GND. As shown in FIG. 6, when connection between the fixing belt 53 and GND is disconnected due to, for example, a wiring disconnection, the current from the power source at the primary circuit does not flow through the light emitting diode 501*a*. As a result, the light emitting diode 501*a* does not emit light. When the light is not received from the light emitting diode 501*a*, a current from the power source of the secondary circuit will not flow through the light receiving element 501*b*. Upon detecting that the current is not flowing through the light receiving element 501*b*, the microcomputer 502 outputs a notification indicating the abnormal state to the control device 70.

Upon obtaining the notification indicating the abnormal state, the control device 70 determines that the fixing belt 53 is not connected to GND (abnormal state). When it is determined that the fixing belt 53 is not connected to GND, the control device 70 stops the rotation (or will not start the rotation) of the fixing belt 53 and stops the heating process (or will not start the heating process) by the heater 55.

According to such a configuration, it can be reliably detected whether the fixing belt 53 is connected to GND, and when the fixing belt 53 is not connected to GND, operations of the fixing belt 53 and heater 55 are definitely stopped. In the aforementioned embodiments, the microcomputer 502 outputs the notification indicating the abnormal state when the current is not flowing through the light receiving element 501*b*, but the present disclosure is not limited thereto. For example, the microcomputer 502 may output the notification indicating an abnormal state when the current level of the current flowing through the light receiving element 501*b* is less than or equal to some predetermined threshold value or the like. Hereinafter, an operation of a mechanism for detecting whether the fixing belt 53 is connected to GND will be described.

Figure 7:
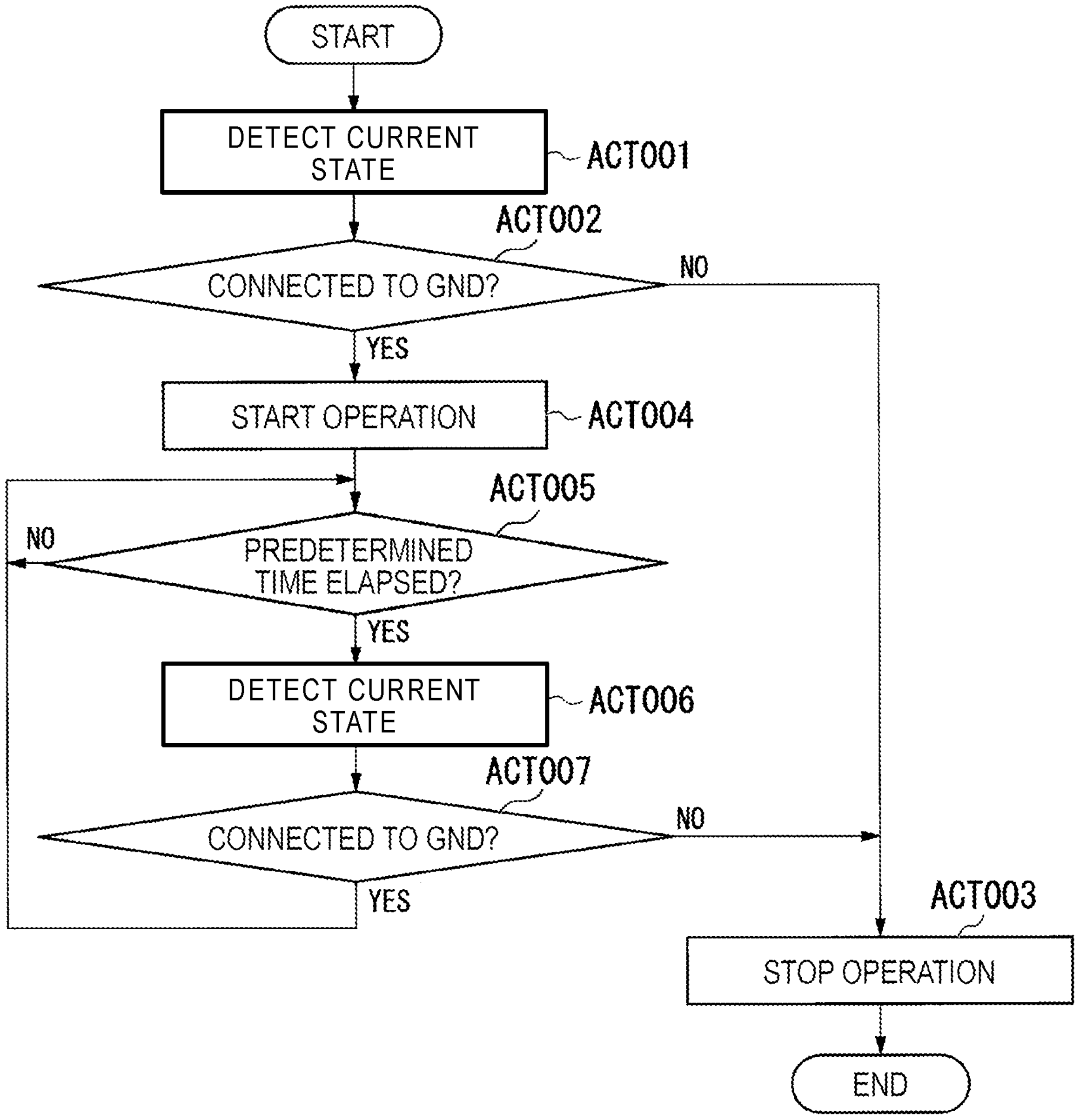
FIG. 7 is a flowchart of operations of an image forming apparatus.

FIG. 7 is a flowchart of operations of the image forming apparatus 1.

The microcomputer 502 detects a current state (ACT 001). When detecting that the current is flowing, the microcomputer 502 outputs a notification indicating the normal state to the control device 70. On the other hand, when detecting that the current is not flowing, the microcomputer outputs a notification indicating the abnormal state to the control device 70. The control device 70 receives the notification output from the microcomputer 502.

Upon receiving a notification indicating the abnormal state, the control device 70 determines that the fixing belt 53 is not connected to GND. Upon determining that the fixing belt 53 is not connected to GND (No in ACT 002), the control device 70 stops (or will not permit the start of) the rotation of the fixing belt 53 and the heating process by the heater 55 (ACT 003). Thus, the operations of the image forming apparatus 1 shown in the flowchart of FIG. 7 end.

On the other hand, upon determining that the fixing belt 53 is connected to GND (Yes in ACT 002), the control device 70 starts the rotation of the fixing belt 53 and the heating process by the heater 55 (ACT 004).

Then, after a predetermined time increment (for example, one second) elapses (Yes in ACT 005), the microcomputer 502 detects the current state again (ACT 006). Upon detecting that the current is not flowing, the microcomputer 502 outputs a notification indicating the abnormal state to the control device 70. The control device 70 receives the notification output from the microcomputer 502.

Upon receiving the notification indicating the abnormal state, the control device 70 determines that the fixing belt 53 is not connected to GND. Upon determining that the fixing belt 53 is not connected to GND (No in ACT 007), the control device 70 stops the rotation of the fixing belt 53 and the heating process by the heater 55 (ACT 003). Then, the operations of the image forming apparatus 1 shown in the flowchart of FIG. 7 end.

On the other hand, when detecting that the current is flowing, the microcomputer 502 outputs a notification indicating the normal state to the control device 70. The control device 70 receives the notification output from the microcomputer 502. Upon receiving the notification indicating the normal state, the control device 70 determines that the fixing belt 53 is connected to GND. Upon determining that the fixing belt 53 is connected to GND (Yes in ACT 007), the control device 70 continues to rotate the fixing belt 53 and perform the heating process by the heater 55. Thereafter, after another predetermined time increment (for example, one second) elapses (Yes in ACT 005), the microcomputer 502 detects the current state again (ACT 006). The subsequent operations are the same as described above.

Modified Example

In some instances, the fixing belt 53 may become an electrically active part due to, for example, malfunction of the heater 55 or breakage of the glass layer 55*c* or 55*d*. When the fixing belt 53 becomes an electrically active part, a current may flow from the power source of the primary circuit into the fixing belt 53 even if the intended connection of the fixing belt 53 to GND is disconnected. In this case, the light emitting diode 501*a* of the photocoupler 501 may erroneously emit light.

If the light emitting diode 501*a* erroneously emits light, the light receiving element 501*b* receives the light emitted by the light emitting diode 501*a* and will thus still allow a current to flow from the power source on the secondary circuit to GND through the light receiving element 501*b*. Upon detecting the current, the microcomputer 502 could output a notification indicating the normal state to the control device 70. Based upon this notification indicating the normal state, the control device 70 would erroneously determine that the fixing belt 53 is still properly connected to GND. Accordingly, despite the fixing belt 53 not being connected to GND, the rotation of the fixing belt 53 and the heating process by the heater 55 might still be performed or attempted.

In the present example, it is assumed that the heater 55 is a heater that performs a heating process by cycling between an on state and an off state to achieve the desired heating level. In such a case, the microcomputer 502 can be configured, for example, to detect the current state only when the heater 55 is in an off state of the heating process. This can prevent the erroneous operation described above since no current is separately being provided to the heater 55 during the off state.

Another example of the operation of the mechanism for detecting whether the fixing belt 53 is connected to GND will be described.

Figure 8:
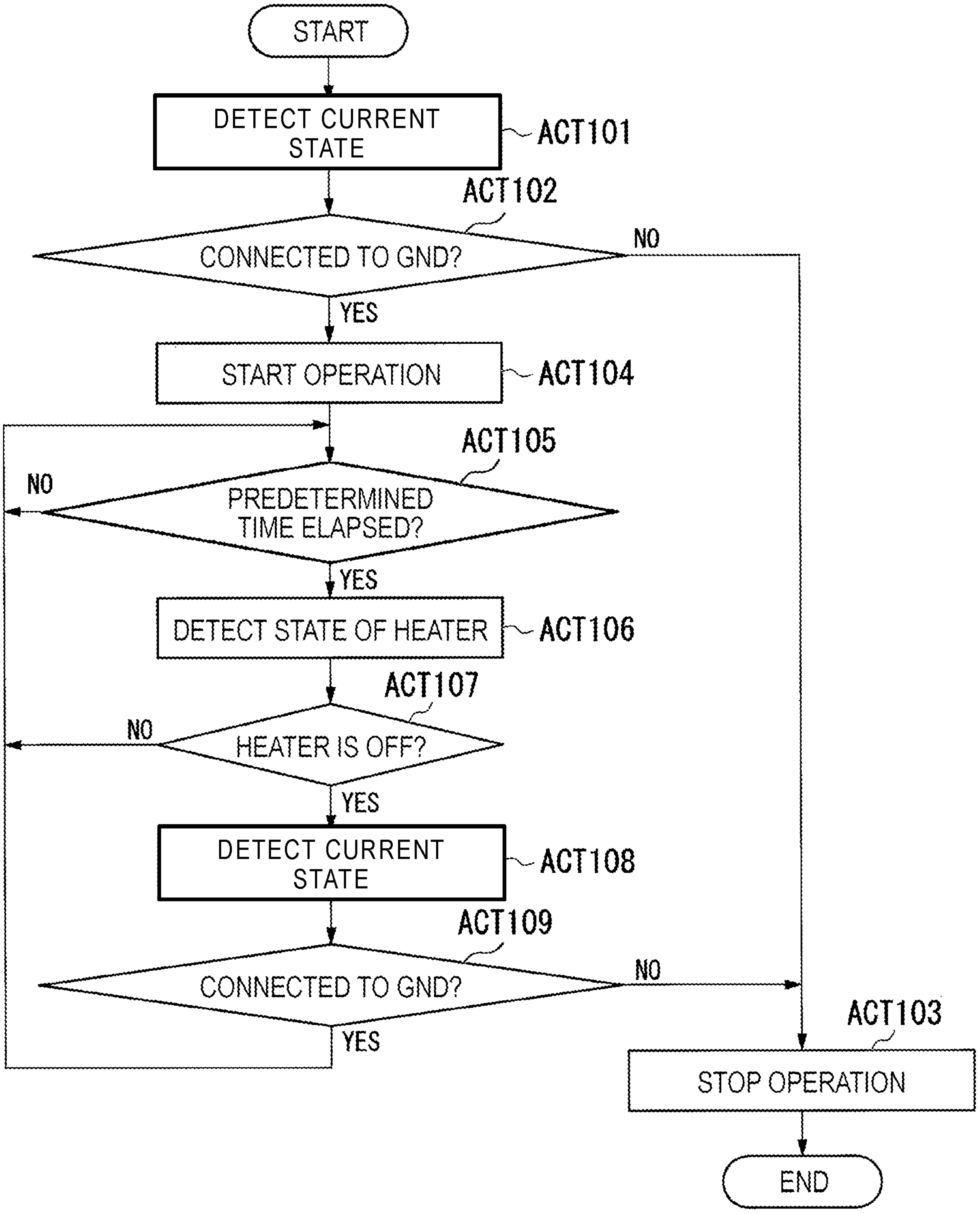
FIG. 8 is a flowchart of operations of the image forming apparatus.

FIG. 8 is a flowchart of operations of the image forming apparatus 1. Operations from ACT 101 to ACT 104 shown in FIG. 8 are substantially the same as the operations from ACT 001 to ACT 004 described in conjunction with FIG. 7, and thus separate descriptions thereof are omitted.

After the operation of ACT 104, after a predetermined time increment (for example, one second) elapses (Yes in ACT 105), the microcomputer 502 (or the control device 70) detects a state of the heating process by the heater 55 (ACT 106). When the heater 55 is an on state (No in ACT 107), the microcomputer 502 does not detect the current application state.

When the state of the heating process by the heater 55 is an off state (Yes in ACT 107), the microcomputer 602 detects the current application state again (ACT 108). Upon detecting that the current is not flowing, the microcomputer 502 outputs the notification indicating the abnormal state to the control device 70. The control device 70 receives the notification output from the microcomputer 502.

Upon receiving the notification indicating the abnormal state, the control device 70 determines that the fixing belt 53 is not connected to GND. Upon determining that the fixing belt 53 is not connected to GND (No in ACT 109), the control device 70 stops the rotation of the fixing belt 53 and the heating process by the heater 55 (ACT 103). As such, the operations of the image forming apparatus 1 shown in the flowchart of FIG. 8 end.

On the other hand, upon detecting that the current is flowing, the microcomputer 502 outputs the notification indicating the normal state to the control device 70. The control device 70 receives the notification output from the microcomputer 502. Upon receiving the notification indicating the normal state, the control device 70 determines that the fixing belt 53 is connected to GND. Upon determining that the fixing belt 53 is connected to GND (Yes in ACT 109), the control device 70 continues to rotate the fixing belt 53 and perform the heating process by the heater 55. Thereafter, after the predetermined time increment (for example, one second) elapses (Yes in ACT 105), the microcomputer 502 again detects the state of the heating process by the heater 55 (ACT 106). The subsequent operations are the same as described above.

As described above, the image forming apparatus 1 according to the above embodiments includes the fixing device 50 and the control device 70. The fixing device 50 includes the heater 55 and the fixing belt 53. The fixing belt 53 contacts each of the heater 55 and a member (for example, the thermistor 58) that is not in contact with the heater 55. The fixing belt 53 is heated by the heater 55. The control device 70 determines whether the fixing belt 53 is connected to GND. When it is determined that the fixing belt 53 is not connected, the control device 70 stops the heating process by the heater 55.

With the above configuration, the image forming apparatus 1 may detect whether the fixing belt 53 is connected to GND. Accordingly, the image forming apparatus 1 may stop the heating by the heater 55 when the fixing belt 53 is not connected to GND.

As described above, in a belt type or on-demand type fixing device, static electricity may be accumulated on the fixing belt. When the static electricity is accumulated on the fixing belt, an electrostatic offset may occur and the quality of an output image may deteriorate. However, in the image forming apparatus 1 according to the aforementioned embodiments, static electricity may be discharged by connecting the fixing belt 53 to GND. Furthermore, since the image forming apparatus 1 may stop the fixing device 50 when it is detected that the fixing belt 53 is not connected to GND, accumulation of static electricity on the fixing belt 53 can be prevented. As a result, occurrence of an electrostatic offset can be prevented.

As described above, since occurrence of an electrostatic offset is prevented, deterioration of the quality of an output image is prevented.

The image forming apparatus 1 stops a current flowing to the heater 55 when it is detected that the fixing belt 53 is not connected to GND. As a result, an unintended change in the distance between the heater 55 and the fixing belt 53 can be prevented.

Various functions of the image forming apparatus 1 in the above-described embodiments may be implemented by a computer executing a software program. In such a case, the program for implementing the function (or functions) can be recorded on a non-transitory computer readable recording medium and the function is be performed by a computer system that reads and executes the program recorded on the recording medium. Here, a "computer system" includes hardware, such as one or more processors, one or more peripheral devices, or the like. The computer system may function according to an operating system thereon. In this context, a "computer readable recording medium" denotes a portable medium, such as a flexible disk, a magneto-optical disk, ROM, CD-ROM, or the like, or a storage device such as a hard disk or the like built in the computer system. The "computer readable recording medium" may be implemented as a cloud-based storage solution and/or server and the relevant program may be transmitted via a communication link, such as a network like the Internet, or a telephone line. The relevant program for implementing a function or functions described above, may perform the function in combination with another program or programs already recorded on the computer system, such as an operating system of the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
a fixing unit including:
a belt that is electrically connected between a first power source and a first ground terminal, and
a heater configured to heat the belt and including a substrate and a heating layer that is formed on the substrate;
a detection element electrically connected to the belt and by which a current that flows through the belt is detected; and
a controller configured to shut off the heater if no current flows through the belt, wherein
the detection element includes a light emitting diode and a light receiving element,
a cathode of the light emitting diode is electrically connected to the belt, and an anode of the light emitting diode is electrically connected to the first power source,
the light receiving element is electrically connected between a second power source and a second ground terminal, and
the controller is configured to determine whether a current is flowing through the belt by detecting a current flowing through the light receiving element.

2. The image processing apparatus according to claim 1, wherein the heater further includes a glass layer that contacts the belt.

3. The image processing apparatus according to claim 1, wherein the heater further includes a structure including a glass layer and the heating layer and contacting the belt and the substrate.

4. The image processing apparatus according to claim 1, wherein the heater is disposed on an inner circumferential side of the belt.

5. The image processing apparatus according to claim 1, wherein the belt further includes a microcomputer configured to detect a current flowing through the belt.

6. The image processing apparatus according to claim 1, wherein the controller is further configured to:
control the heater to alternately switch between an on state and an off state, and
not monitor a current that flows through the belt when the heater is in the on state.

7. The image processing apparatus according to claim 1, wherein the detection element includes a photocoupler including the light emitting diode and the light receiving element.

8. The image processing apparatus according to claim 1, further comprising:
an image forming unit configured to form a toner image on a sheet, wherein
the toner image is fixed to the sheet by the fixing unit.

9. A fixing unit, comprising:
a belt that is electrically connected between a first power source and a first ground terminal;
a heater configured to heat the belt and including a substrate and a heating layer that is formed on the substrate;
a detection element electrically connected to the belt and by which a current that flows through the belt is detected; and
a controller configured to shut off the heater if no current flows through the belt, wherein
the detection element includes a light emitting diode and a light receiving element, a cathode of the light emitting diode is electrically connected to the belt, and an anode of the light emitting diode is electrically connected to the first power source, the light receiving element is electrically connected between a second power source and a second ground terminal, and the controller is configured to determine whether a current is flowing through the belt by detecting a current flowing through the light receiving element.

10. The fixing unit according to claim 9, wherein the heater further includes a glass layer that contacts the belt.

11. The fixing unit according to claim 9, wherein the heater further includes a structure including a glass layer and the heating layer and contacting the belt and the substrate.

12. The fixing unit according to claim 9, wherein the heater is disposed on an inner circumferential side of the belt.

13. The fixing unit according to claim 9, wherein the controller is further configured to:

control the heater to alternately switch between an on state and an off state, and not monitor a current that flows through the belt when the heater is in the on state.

14. A method for controlling an image processing apparatus having:

a belt that is electrically connected between a first power source and a first ground terminal, a heater configured to heat the belt, the heater including a substrate and a heating layer that is formed on the substrate, and a detection element electrically connected to the belt and by which a current that flows through the belt is detected, the method comprising:

detecting that no current is flowing through the belt while controlling the heater to heat the belt; and shutting off the heater in response to detecting that no current is flowing through the belt, wherein the detection element includes a light emitting diode and a light receiving element, a cathode of the light emitting diode is electrically connected to the belt, and an anode of the light emitting diode is electrically connected to the first power source, the light receiving element is electrically connected between a second power source and a second ground terminal, and detecting includes determining whether a current is flowing through the belt by detecting a current flowing through the light receiving element.

15. The method according to claim 14, wherein the heater further includes a glass layer that contacts the belt.

16. The method according to claim 14, wherein the heater further includes a structure including a glass layer and the heating layer and contacting the belt and the substrate.

17. The method according to claim 14, wherein the heater is disposed on an inner circumferential side of the belt.

* * * * *